US012755183B2

(12) United States Patent
Upadhyay

(10) Patent No.: US 12,755,183 B2
(45) Date of Patent: Oct. 6, 2026

(54) MEMORY-SAVING OPTIMIZATION OF QUADRATIC FORMS

(71) Applicant: Fujitsu Limited, Kawasaki (JP)

(72) Inventor: Sarvagya Upadhyay, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 958 days.

(21) Appl. No.: 18/087,592

(22) Filed: Dec. 22, 2022

(65) Prior Publication Data

US 2024/0220841 A1 Jul. 4, 2024

Related U.S. Application Data

(60) Provisional application No. 63/362,132, filed on Mar. 30, 2022.

(51) Int. Cl.
*G06N 10/60* (2022.01)
*G06N 10/20* (2022.01)

(52) U.S. Cl.
CPC ............. *G06N 10/60* (2022.01); *G06N 10/20* (2022.01)

(58) Field of Classification Search
CPC ........ G06N 10/00; G06N 10/20; G06N 10/60; G06N 10/70; G06N 10/80; G06F 17/00; G06F 17/10; G06F 17/11
USPC .................. 327/186, 366, 527, 528; 326/1–7
See application file for complete search history.

(56) References Cited

U.S. PATENT DOCUMENTS 11,526,793 B2 * 12/2022 Daraeizadeh ......... G06T 15/005
11,989,623 B2 * 5/2024 Tomaru .................. G06N 10/20
2023/0315800 A1 * 10/2023 Upadhyay ............... G06F 17/11 703/2

OTHER PUBLICATIONS

EP Office Action dated Feb. 25, 2026 in application No. 23162888.4.
Moussa et al,"Funtion Maximization with Dynamic Quantum Search" Feb. 19, 2019, XP 47505563A l.
Brando et al, "Quantum Speed-Ups for Solving Semidefinite Programs" Oct.15, 2017, XP 33253611A l.
Van Apeldoorn et al, "Quantum SDP-Solvers: Better Upper and Lower Bounds" Oct. 15, 2017, XP 33253610A l.
(Continued)

*Primary Examiner* — Hai L Nguyen
(74) *Attorney, Agent, or Firm* — Maschoff Brennan

(57) ABSTRACT

A method may include obtaining a first and a second copy of a quantum state in which the first and second copies of the quantum state represent a convex optimization problem. The first and second copies of the quantum state may include respective index quantum registers that each hold indices and respective mixing state quantum registers that each hold quantum mixing states. The method may include amplifying and measuring an amplitude of the index quantum register associated with the first copy of the quantum state in which the measured amplified amplitude corresponds to a particular index. The method may include determining a final quantum mixing state corresponding to the mixing state quantum register of the second copy of the quantum state based on the measured amplified amplitude and the particular index. The method may include determining a solution to the convex optimization problem based on the final quantum mixing state.

20 Claims, 6 Drawing Sheets

(56) References Cited

OTHER PUBLICATIONS

"Improved approximation for maximum cut and maximum satisfiability problem using semidefinite programming" M. Goemans and D. Williamson, 1995.
"The mixing method for MAX-CUT SDP" P. Wang and Z. Kolter, 2016.
"Quantum algorithm for systems of linear equations with exponentially improved dependence on precision" A. Childs, R. Kothari, and R. Somma, 2017.
"Correlation clustering: maximum agreements via SDPs" C. Swamy, 2004.
"Quantum SDP-Solvers: Better upper and lower boun" J. van Apeldoorn, A. Gilyen, S. Gribling, and R. de Wolf, 2020.

* cited by examiner

MEMORY-SAVING OPTIMIZATION OF QUADRATIC FORMS

CROSS-REFERENCE TO RELATED APPLICATIONS

This application claims the benefit of U.S. Patent Application Ser. No. 63/362,132, filed on Mar. 30, 2022, the disclosure of which is incorporated herein by reference in its entirety.

FIELD OF THE INVENTION

The present disclosure generally relates to memory-saving optimization of quadratic forms.

BACKGROUND

An optimization problem may be solved by finding an input value that returns a maximum value or a minimum value for a function that represents the optimization problem. Solving the optimization problem may be difficult because the time required to determine a feasible solution to the optimization problem, and the time needed to determine a feasible solution may increase exponentially depending on the number of variables that must be optimized to solve the optimization problem.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a first and a second copy of a quantum state in which the first and the second copies of the quantum state represent a convex optimization problem. The first and the second copy of the quantum state may include respective index quantum registers that each hold indices and respective mixing state quantum registers that each hold quantum mixing states. The method may include amplifying and measuring an amplitude corresponding to the index quantum register associated with the first copy of the quantum state in which the measured amplified amplitude corresponds to a particular index. The method may include determining a final quantum mixing state corresponding to the mixing state quantum register of the second copy of the quantum state based on the measured amplified amplitude and the particular index. The method may include determining a solution to the convex optimization problem based on the final quantum mixing state.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
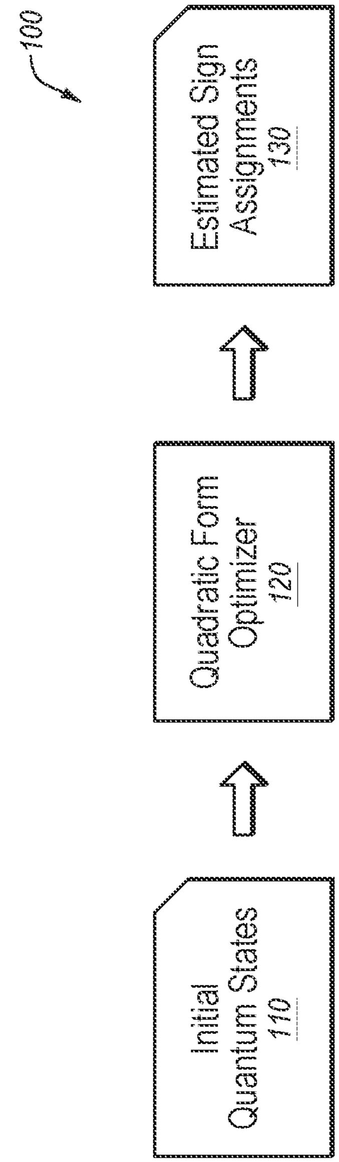
FIG. 1 is a diagram of an example embodiment of a memory-saving quadratic form optimization process according to one or more embodiments of the present disclosure.

Quadratic forms may be used to represent various different optimization problems, such as convex optimization problems, relating to graph theory, node clustering, machine learning, or other technological disciplines by representing such problems using variables constrained to discrete choices, such as binary states (e.g., a first discrete state of −1 and a second discrete state of 1, or a first discrete state of 0 and a second discrete state of 1). However, identifying an optimized solution to a particular quadratic form may be a difficult computational problem to solve because variables associated with the particular quadratic form may be constrained to the discrete choices. Furthermore, setting a particular variable to a particular discrete state may affect the output of the particular quadratic form in a first way, while setting the same particular variable to the same particular discrete state may affect the output of the particular quadratic form in a second way based on changes to other variables associated with the particular quadratic form. Thus, optimizing the output of the particular quadratic form (e.g., maximizing or minimizing a value of the output) may pose a complicated problem, especially as the number of variables associated with the particular quadratic form increases.

A general quadratic form that represents a given optimization problem may include n variables and may be represented as the following function, Q:

$$Q(x_1, x_2, x_3, \ldots, x_n) = a_{11}x_1^2 + a_{12}x_1x_2 + \ldots + a_{1n}x_1x_n + a_{21}x_2x_1 + a_{22}x_2^2 + \ldots + a_{nn}x_n^2 \quad (1)$$

in which pairs of variables represented by $x_i$ and $x_j$ are related according to a corresponding coefficient, $a_{ij}$. As described in Equation (1), for example, a particular pair of variables, $x_1$ and $x_2$, are related according to a coefficient, $a_{12}$. In other words, coefficients, $a_{i1}$ through $a_{in}$ are involved with a respective variable, $x_i$. The general quadratic form may be represented as a summation relating the coefficients and the variables:

$$Q(x_1, x_2, x_3, \ldots, x_n) = \sum_{i,j}^{n} a_{ij}x_ix_j \quad (2)$$

Because each term of the quadratic form is modified according to a coefficient related to two variables, the general quadratic form may additionally or alternatively be represented by a matrix A in which the coefficients, $a_{ij}$, are represented by intersections between rows and columns of the matrix.

In some situations, a convex relaxation approach may be used to approximate the particular quadratic form and determine feasible solutions to a particular quadratic form. For example, a matrix of a quadratic form may be written with a nonconvex constraint as:

$$\max\langle A, X\rangle \text{ subject to } X = xx^T \text{ and } X_{ii} = x_i^2 = 1 \tag{3}$$

in which the $X=xx^T$ constraint is a nonconvex constraint relating to the matrix of the quadratic form that may be relaxed to an easier-to-solve constraint by indicating that X is positive semidefinite (i.e., X>0). As such, the quadratic form may be rewritten as:

$$\max\langle A, X\rangle \text{ subject to } X \succcurlyeq 0 \text{ and } X_{ii} = 1 \tag{4}$$

Positive semidefinite matrices, such as X, may be expressed by a set of vectors such that $X_{ij}=\langle v_i,v_j\rangle$, and the constraint $X_{ii}=1$ indicates that vectors included in the set of vectors are unit vectors such that $\langle v_i,v_j\rangle=\|v_i\|^2=1$. The quadratic form represented by Equation (2) may be simplified to the following vector form:

$$\max_{v_i\in\mathbb{R}^n:\|v_i\|=1}\sum_{i,j=1}^{n} A_{ij}\langle v_i, v_j\rangle \tag{5}$$

Sign assignments corresponding to each of the binary variables of the optimization problem may be determined based on the vector form described in Equation (5) using a rounding method. The rounding method may involve selecting a random vector, λ, and assigning a binary variable, $x_i$, corresponding to a vector included in the set of vectors, $v_i$, a value according to the dot product of the random vector and the vector included in the set.

The present disclosure may relate to, among other things, a system and a method of quantizing quadratic forms and determining solutions to optimization problems using a heuristic approach implemented in a quantum computing system. Determining a feasible solution to the quadratic form via the above semidefinite programming process may still be computationally intensive and require a large amount of computation resources and/or time to process because computation of the vectors by a classical computing system may involve a complicated matrix decomposition process. Converting a particular quadratic form such that the particular quadratic form may be implemented in a quantum computing system may facilitate determining one or more feasible solutions to the particular quadratic form because the variables corresponding to the particular quadratic form may be modeled using quantum bits, or qubits, that are capable of being configured in superposition. In other words, a particular qubit representing a respective variable corresponding to the particular quadratic form may be simultaneously represented using a first discrete state and a second discrete state in a quantum computing system rather than being exclusively represented using the first discrete state or the second discrete state as a bit in a classical computing system. However, determining a feasible solution to the quadratic form using existing approaches in a quantum computing system, such as a convex relaxation approach, may involve large number of qubits used by the quantum computing system to process the relevant computations.

Thus, optimization of quadratic forms according to the present disclosure may provide various improvements over existing processes of determining and optimizing feasible solutions corresponding to the quadratic forms and improve the functionality of quantum computing systems. For example, optimization of quadratic forms according to a heuristic approach according to one or more embodiments of the present disclosure may be more memory-efficient than existing methods, such as classical semidefinite programming approaches or even other convex relaxation approaches involving quantum computing systems. Additionally or alternatively, optimization of quadratic forms may be more applicable to larger matrices corresponding to more complicated quadratic forms because of the memory savings from using the heuristic quadratic form optimization approach according to one or more embodiments of the present disclosure. Additionally or alternatively, the amount of time taken to determine a feasible solution to a particular quadratic form may decrease by implementing the heuristic approach described in the present disclosure.

Consequently, the system and method of optimizing quadratic forms according to the present disclosure may improve operations of computer systems that are configured to implement and/or solve problems that involve such quadratic forms. Real-world problems may be modeled using quadratic forms that may be optimized according to one or more embodiments of the present disclosure. For example, a social network may be modeled as a convex optimization problem that involves semidefinite programming of positive semidefinite matrices in which detection of communities included in the social network may facilitated by modeling the positive semidefinite matrices as quadratic forms as described in further detail below. As an additional or alternative example, very large-scale integrated circuits may be modeled as quadratic forms in which optimizing the quadratic forms overcomes design constraints as described in further detail below. As an additional or alternative example, phase recovery problems may be modeled as quadratic forms in which optimizing the quadratic forms may provide insights regarding microscopy imaging as described in further detail below.

Embodiments of the present disclosure are explained with reference to the accompanying figures.

FIG. 1 is a diagram of an example embodiment of an environment 100 configured to perform a memory-saving quadratic form optimization process according to one or more embodiments of the present disclosure. In some embodiments, the memory-saving quadratic form optimization process may involve obtaining one or more initial quantum states 110 that represent variables corresponding to convex optimization problems, such as a quadratic unconstrained binary optimization (QUBO) problem. For example, a quadratic form optimizer 120 of the environment 100 may obtain the initial quantum states 110 and output estimated sign assignments 130 that represent the discrete values of the variables corresponding to a feasible solution to the convex optimization problem.

In some embodiments, the quadratic form optimizer 120 may include code and routines configured to enable a computing system to perform one or more operations. Additionally or alternatively, the quadratic form optimizer 120 may be implemented using hardware including a processor, a microprocessor (e.g., to perform or control performance of one or more operations), a field-programmable gate array (FPGA), or an application-specific integrated circuit (ASIC). In some other instances, the quadratic form optimizer 120 may be implemented using a combination of hardware and software. In the present disclosure, operations described as being performed by the quadratic form optimizer 120 may include operations that the quadratic form optimizer 120 may direct one or more corresponding systems to perform. The quadratic form optimizer 120 may be configured to perform a series of operations with respect to the initial quantum states 110 and/or the estimated sign assignments 130 as described in further detail below and in relation to a system 200 as described with respect to FIG. 2.

Quantum states may include a set of quantum numbers that describe an initial state of a quantum system in which the quantum system is a quantum representation of a given convex optimization problem. A given quantum state, $|\psi\rangle$, may correspond to a respective qubit that is represented by the following summation:

$$|\psi\rangle = \sum_{i=1}^{2^n} a_i |i\rangle \tag{6}$$

in which $a_i$ is a coefficient representing an amplitude of a respective binary quantum state, $|i\rangle$. A linear combination of reversible unitary operations that change the qubit corresponding to the given quantum state to another quantum state may be applied to the initial quantum states. Additionally or alternatively, irreversible measurement operations may be performed on the initial quantum states or any subsequent quantum states to extract information about a classical system analogue of the quantum system.

In some embodiments, the initial quantum states 110 may represent a set of unitary quantum states based on a matrix, $A_{ij}$, that represents a particular convex optimization problem. Setting up the initial quantum states 110 may be represented by the following equation:

$$|i\rangle \overset{U_i}{\rightarrow} \frac{1}{\|A_i\|_1} \sum_{j=1}^{n} \sqrt{A_{ij}}\, |j\rangle \tag{6}$$

In Equation (6), a first matrix, U, may be applied to a particular initial quantum state 110, $|i\rangle$, to convert the initial quantum state 110 with respect to the matrix that represents the particular convex optimization problem. For each row of the first matrix, $U_i$, a corresponding initial quantum state 110 represented by the right-hand side of the Equation (6) and a corresponding row of the convex optimization problem matrix, $A_i$, may be generated.

A second matrix, $W_{ij}$, may be applied to the initial quantum states 110 to determine signs associated with the initial quantum states 110 according to the following equation:

$$|i\rangle|j\rangle \overset{W_{ij}}{\longrightarrow} \text{sign}(A_{ij})|i\rangle|j\rangle \tag{7}$$

In Equation (7), the sign corresponding to the quantum state, $|i\rangle|j\rangle$, may be changed from a positive state to a negative state or from a negative state to a positive state depending on the value of sign($A_{ij}$), which may be determined based on the second matrix.

In these and other embodiments, each of the initial quantum states 110 may include four quantum registers such that each of the initial quantum states 110 is represented by quantum registers (A, B, C, D). The quantum registers (A, B, C) may each hold indices from 1 to n, and the quantum register D may hold a quantum mixing state. In some embodiments, the contents of the quantum registers (A, B) may be generated based on controlled actions relating to rows of the first matrix, $U_i$, and the second matrix, $W_{ij}$, as described in relation to the system 200 of FIG. 2 below.

The quadratic form optimizer 120 may perform one or more operations with respect to the initial quantum states 110 as described below in relation to FIG. 2 to output estimated sign assignments 130. A given estimated sign assignment 130 may indicate one of two binary values for each respective quantum state corresponding to the initial quantum states 110 as determined according to the operations of the quadratic form optimizer 120. The quantum states to which the estimated sign assignments 130 correspond may be mapped onto classical variables of a classical system that represents a convex optimization problem such that a feasible solution to the convex optimization problem may be determined according to the estimated sign assignments 130.

Modifications, additions, or omissions may be made to the environment 100 without departing from the scope of the present disclosure. For example, the designations of different elements in the manner described is meant to help explain concepts described herein and is not limiting. For instance, in some embodiments, the initial quantum states 110, the quadratic form optimizer 120, and the estimated sign assignments 130 are delineated in the specific manner described to help with explaining concepts described herein but such delineation is not meant to be limiting. Further, the environment 100 may include any number of other elements or may be implemented within other systems or contexts than those described.

Figure 2:
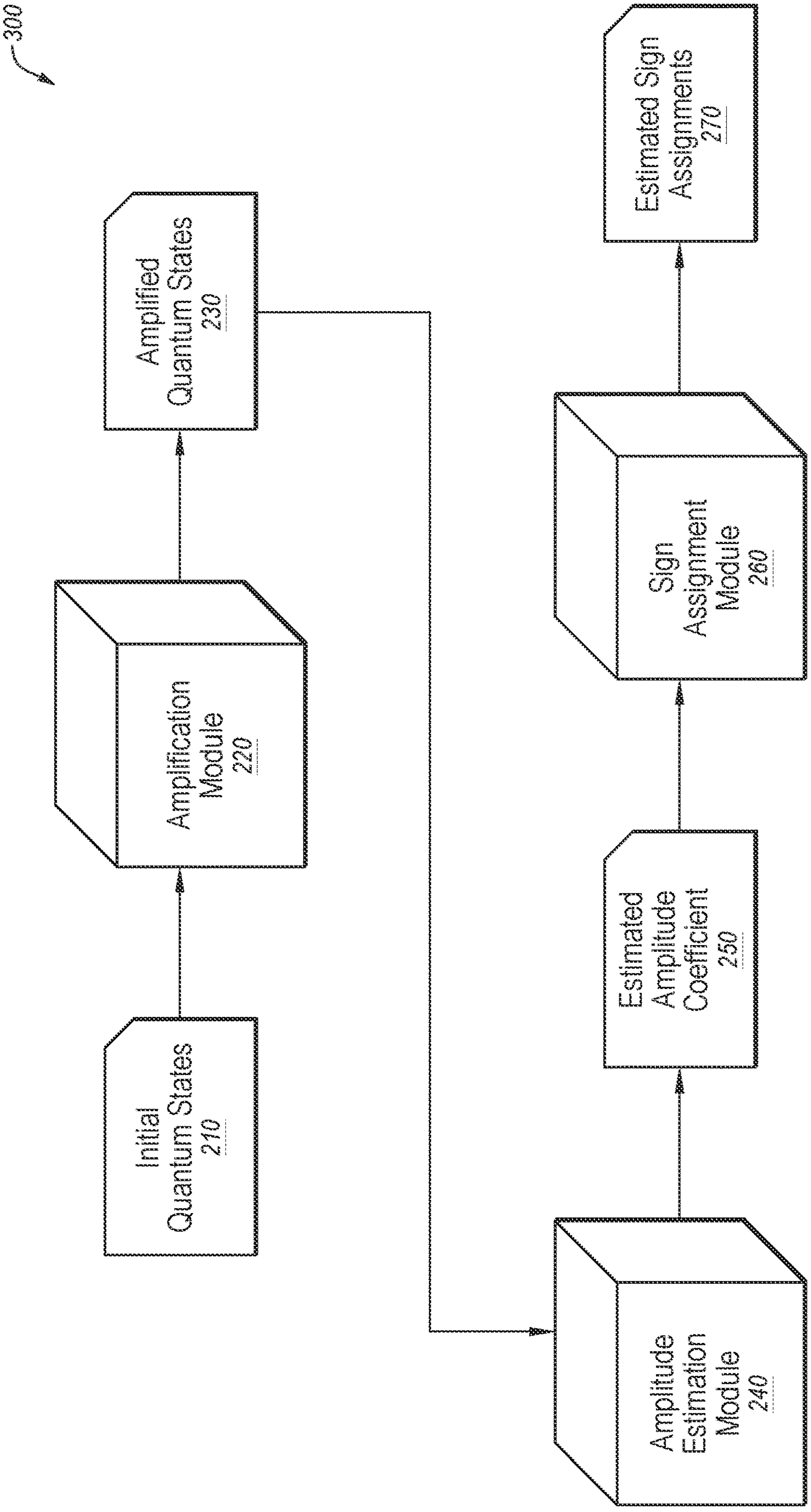
FIG. 2 is a diagram of an example embodiment of a computer system configured to perform memory-saving optimization of quadratic forms according to one or more embodiments of the present disclosure.

FIG. 2 is a diagram of an example embodiment of a system 200 configured to perform memory-saving optimization of quadratic forms according to one or more embodiments of the present disclosure. The system 200 may include an amplification module 220 that is configured to obtain initial quantum states 210 and output amplified quantum states 230 in which a respective amplified quantum state 230 corresponds to a respective initial quantum state 210, and an amplitude estimation module 240 may determine an estimated amplitude coefficient 250 based on the amplified quantum states 230. A sign assignment module 260 may be configured to determine estimated sign assignments 270 based on the estimated amplitude coefficient 250.

In some embodiments, one or more of the amplification module 220, the amplitude estimation module 240, or the sign assignment module 260 (collectively referred to herein as "the computing modules") may include code and routines configured to enable a computing system to perform one or more operations. Additionally or alternatively, one or more of the computing modules may be implemented using hardware including a processor, a microprocessor (e.g., to perform or control performance of one or more operations), a field-programmable gate array (FPGA), or an application-specific integrated circuit (ASIC). In some other instances, one or more of the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the initial quantum states 210, the amplified quantum states 230, and/or the estimated amplitude coefficient 250 as described in further detail below. Additionally or alternatively, the computing modules may be included in or form the quadratic form optimizer 120 of FIG. 1.

The initial quantum states 210 may be the same as or similar to the initial quantum states 110 described in relation to the memory-saving quadratic form optimization process described in relation to the environment 100 of FIG. 1, and the amplification module 220 may be configured to set the values of the quantum registers (A, B, C, D) for each of the initial quantum states 210. In some embodiments, the first quantum register, A, may represent a uniform superposition of the overall indices corresponding to the first index, i, and depending on the value of a particular first index, unitary operations, $U_i$, corresponding to the first matrix described in relation to Equation (6) may be applied to the second quantum register, B, which corresponds to the second index, j, with the first quantum register being a control register and the second quantum register being a target register of the unitary operations being applied according to the control register. The resulting quantum registers (A, B) may be represented according to the following form:

$$\frac{1}{\sqrt{n}}\sum_{i=1}^{n}\frac{1}{\|A_i\|_1}|i\rangle\sum_{j=1}^{n}\sqrt{A_{ij}}\,|j\rangle \tag{8}$$

in which the $$\frac{1}{\sqrt{n}}$$

term is a normalization factor, the first quantum register is represented by $$\sum\nolimits_{i=1}^{n}\frac{1}{\|A_i\|_1}|i\rangle,$$

and the second quantum register is represented by $$\sum\nolimits_{j=1}^{n}\sqrt{A_{ij}}\;|j\rangle.$$

In these and other embodiments, a third quantum register and a fourth quantum register (C, D) may be represented according to the following form:

$$\sum_{k=1}^{n}a_k^{(t)}|k\rangle|v_k^{(t)}\rangle \tag{9}$$

in which $$a_k^{(t)}$$

represents an amplitude coefficient of the third quantum register, $|k\rangle$, and $$|v_k^{(t)}$$

$\rangle$ represents the fourth quantum register and a t-th iteration of the quantum mixing state. The third quantum register, C, may be determined by applying a controlled NOT operation (referred to herein as a "CNOT operation") to the third quantum register as the target register with the second quantum register being the control register, resulting in the following quantum state of the quantum system including the four quantum registers (A, B, C, D):

$$\frac{1}{\sqrt{n}}\sum_{i=1}^{n}\frac{1}{\|A_i\|_1}|i\rangle\sum_{j=1}^{n}\sqrt{A_{ij}}\,|j\rangle(a_j^{(t)}|0\rangle v_j^{(t)}\rangle+\sum_{k:k\neq j}^{n}a_k^{(t)}|k\rangle|v_k^{(t)}\rangle) \tag{10}$$

In some embodiments, the amplification module 220 may be configured to amplify the amplitude corresponding to the third quantum register, $$a_j^{(t)},$$

and discard the third quantum register, (C), so that the quantum state may then be represented by the quantum registers (A, B, D) according to the following form:

$$\frac{1}{\sqrt{n}}\sum_{i=1}^{n}\frac{1}{\|A_i\|_1}|i\rangle\sum_{j=1}^{n}\sqrt{A_{ij}}\,|j\rangle|v_j^{(t)}\rangle \tag{11}$$

A controlled inverse operation of the unitary operation, $$U_i^*,$$

may then be applied to the quantum state represented in Equation (11) with the first quantum register as the control register and the second quantum register as the target register. Rearranging the quantum state to (B, A, D) may result in the quantum state being represented by the following form:

$$\sqrt{p(A,V^{(t)})}\,|0\rangle\sum_{i=1}^{n}a_i^{(t+1)}\,|i\rangle\,|v_i^{(t+1)}\rangle+|\psi^{\perp}\rangle \tag{12}$$

in which the $\sqrt{p(A,V^{(t)})}$ term represents a probability that the second quantum register, B, is in a zero quantum state, $|0\rangle$, based on the matrix, A, and a collection of the mixing states in the t-th iteration, $V^{(t)}$. The $|\psi^{\perp}\rangle$ term represents a quantum state that is orthonormal relative to and distinguishable from the quantum state (B, A, D).

The quantum state (B, A, D) represented in Equation (12) may be output by the amplification module 220 as an amplified quantum state 230 contingent on the second quantum register being in the zero quantum state. The amplitude estimation module 240 may be configured to obtain the amplified quantum state 230, which may represent the contents of the quantum state (A, D), and determine the estimated amplitude coefficient 250 based on the amplified quantum state 230. To determine whether the second quantum register is in the zero quantum state, the amplitude estimation module 240 may be configured to amplify the amplitude of the second quantum register and measure the resulting quantum state. It is highly probable that the second quantum register will be in the zero quantum state, and the resulting quantum state including the quantum registers (A, D) may be represented as:

$$\sum_{i=1}^{n} a_i^{(t+1)}|i\rangle|v_i^{(t+1)}\rangle \tag{13}$$

In some embodiments, the amplification module 220 and the amplitude estimation module 240 may be configured to perform operations iteratively for each index included in the indices ranging from a first index 1 to an n-th index to determine a quantum state corresponding to each of the indices over which the operations of the amplification module 220 and the amplitude estimation module 240 are performed.

The quantum state (A, D) represented by Equation (13) may then be used to determine a final quantum mixing state for a particular index, i. The amplitude estimation module 240 may be configured to amplify an amplitude corresponding to the quantum register, A, for the quantum state corresponding to the particular index, $|i\rangle$. With a high probability, the output of this amplitude amplification performable by the amplitude estimation module 240 may be the estimated amplitude coefficient 250, represented as $$a_i^{(T)},$$

that corresponds to the final quantum register, D. In some embodiments, the estimated amplitude coefficient 250 may be used to perform quantum rounding and determine one or more estimated sign assignments that represent a feasible solution to the convex optimization problem to which the quantum system associated with the estimated amplitude coefficient 250 represents as described in further detail in relation to the sign assignment module 260 below.

In some embodiments, operations of the sign assignment module 260 may involve obtaining the estimated amplitude coefficient 250 and outputting the estimated sign assignments 270 through different processes depending on the particular convex optimization problem to which the estimated sign assignments 270 correspond.

The sign assignment module 260 may determine the estimated sign assignments 270 using different quantum rounding processes corresponding to different respective convex optimization problems being represented by the estimated amplitude coefficient 250. For example, the sign assignment module 260 may use the estimated amplitude coefficient 250 in relation to a maximum-cut problem to output the estimated sign assignments 270 that represent a feasible solution to the maximum-cut problem as described in relation to method 300 of FIG. 3. The maximum-cut problem may involve partitioning a graph dataset such that the nodes included in the graph dataset are partitioned to include the greatest number of edges between a first side of the partition and a second side of the partition.

Figure 4:
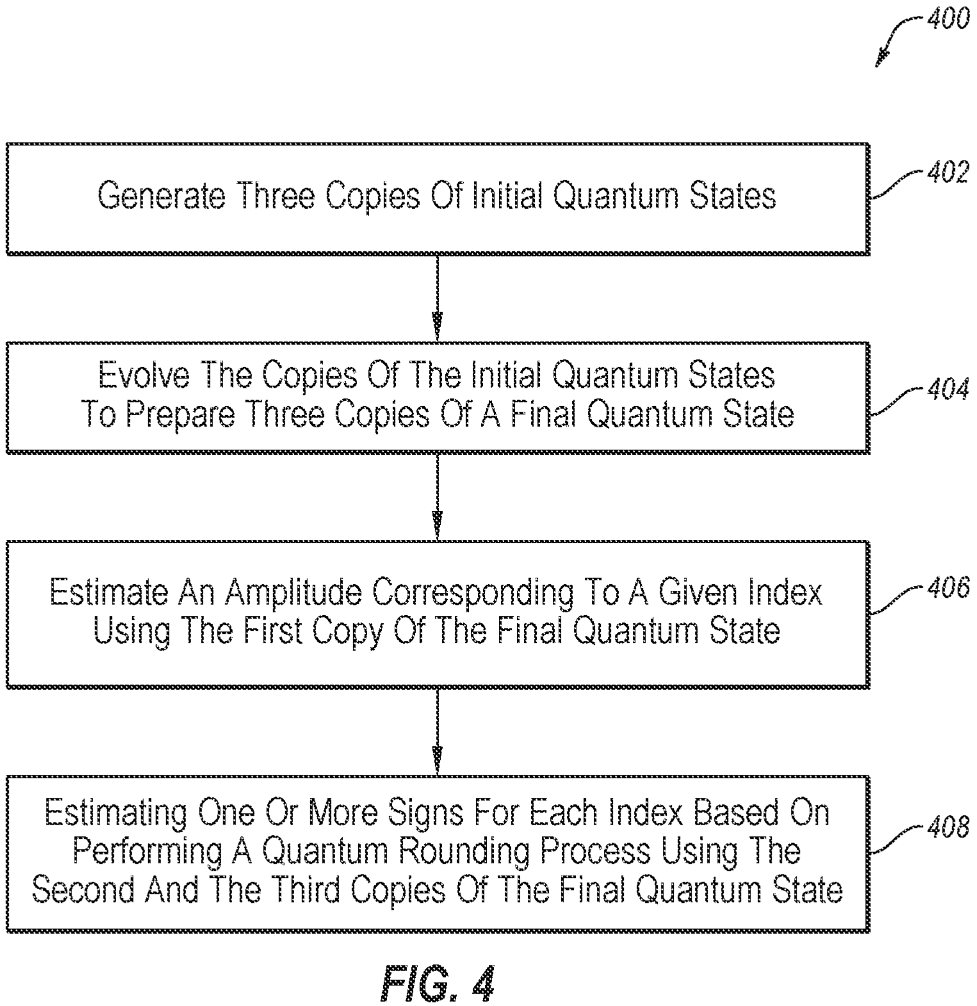
FIG. 4 is a flowchart of the example method of determining a feasible solution to the correlation clustering problem according to one or more embodiments of the present disclosure.

As an additional or alternative example, the sign assignment module 260 may operate according to the steps described in relation to method 400 of FIG. 4 to determine a feasible solution relating to a correlation clustering problem. A particular network may be represented as a graph that includes multiple nodes and edges relating nodes to one another, and a particular edge may include a particular weight value indicating a degree of dissimilarity and a degree of similarity between the two nodes connected by the particular edge. Solving a correlation clustering problem corresponding to the particular network may involve identifying clusters of nodes in which each of the clusters minimize the degree of dissimilarity and maximize the degree of similarity between the included nodes.

The sign estimation process performed by the sign assignment module 260 may be used to facilitate identification of solutions to one or more convex optimization problems or other optimization problems. In some embodiments, the sign assignment module 260 may facilitate identifying solutions to convex optimization problems involving positive semidefinite matrices modeled using semidefinite programming (SDP). For example, the sign assignment module 260 may be configured to identify one or more feasible solutions to a community detection problem relating to networks formed by social media users. The community detection problem may involve identifying two or more communities that exist on a particular social media platform based on relationships between users of the particular social media platform, which may be modeled using quadratic forms and optimized based on the estimated sign assignments 270 according to one or more embodiments of the present disclosure.

As an additional or alternative example, the sign assignment module 260 may be applied to very large-scale integration (VLSI) integrated circuit design, which may be an application of the maximum-cut problem. Solutions to the VLSI design problem may represent circuit designs with the goal of minimizing cross-layer connections in the integrated circuit based on pin assignment and topological layout constraints. The estimated sign assignments 270 outputted by the sign assignment module 260 may facilitate identification of one or more feasible solutions that decreases the cross-layer connections included in the VLSI integrated circuit.

As an additional or alternative example, the sign assignment module 260 may be applied to a phase recovery problem with the goal of reconstructing a complex phase vector based on one or more given magnitudes corresponding to respective linear measurements. Phase recovery problems may involve applications in x-ray imaging, crystallography imaging, diffraction imaging, microscopy, or any other microscopic imaging fields in which detectors may measure amplitudes of microscopic targets but not phases of the microscopic targets. The phase recovery problems may be modeled as non-binary quadratic optimization problems for which feasible solutions may be identified based on the estimated sign assignments 270 as described according to one or more embodiments of the present disclosure.

Modifications, additions, or omissions may be made to the system 200 without departing from the scope of the present disclosure. For example, the designations of different elements in the manner described is meant to help explain concepts described herein and is not limiting. For instance, in some embodiments, the amplification module 220, the amplitude estimation module 240, and the sign assignment module 260 are delineated in the specific manner described to help with explaining concepts described herein but such delineation is not meant to be limiting. Further, the system 200 may include any number of other elements or may be implemented within other systems or contexts than those described.

Figure 3:
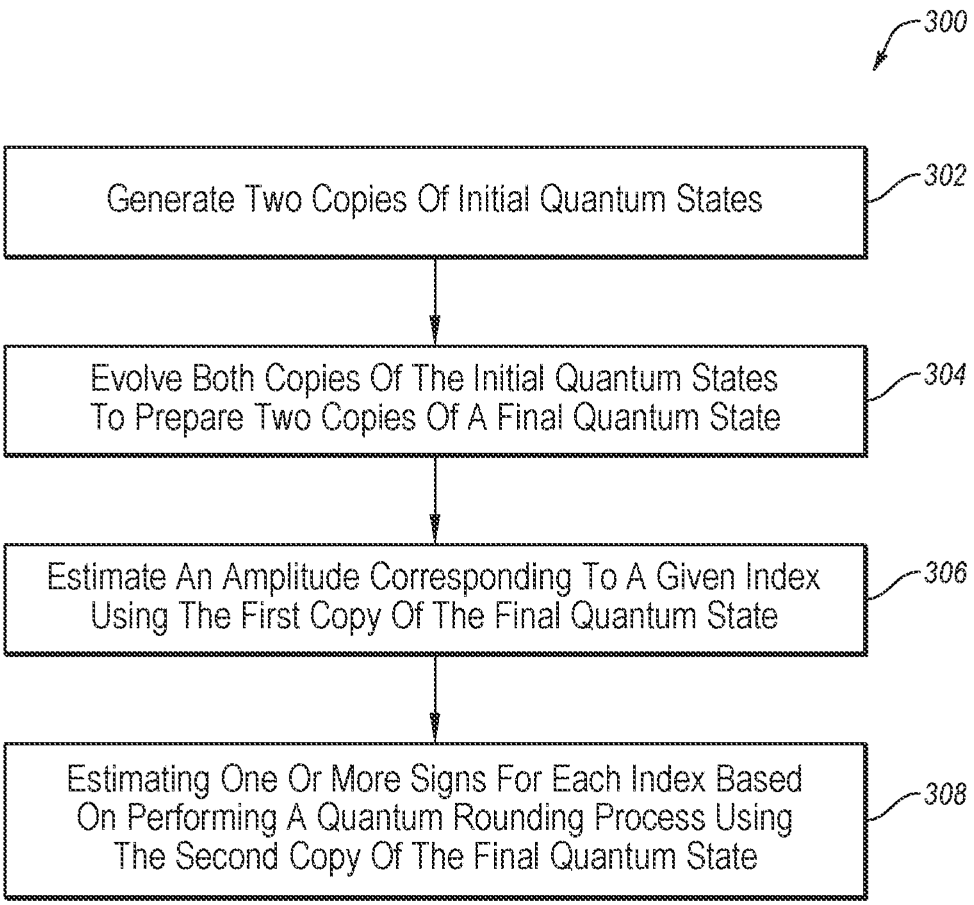
FIG. 3 is a flowchart of the example method of determining a feasible solution to the maximum-cut problem via quantum rounding according to one or more embodiments of the present disclosure.

FIG. 3 is a flowchart of the example method 300 of determining a feasible solution to the maximum-cut problem via quantum rounding according to one or more embodiments of the operations of the computing system 200 of FIG. 2. The method 300 may be performed by any suitable system, apparatus, or device. For example, the amplification module 220 and the amplitude estimation module 240 of FIG. 2 may perform one or more operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where first and second copies of initial quantum states are generated. In some embodiments, the first copies and the second copies of the initial quantum state may be the same as or similar to the initial quantum states 110 as described in relation to the memory-saving quadratic form optimization process of FIG. 1 and the initial quantum states 210 as described in relation to the computing system 200 of FIG. 2. As such, the first copies and the second copies of the initial quantum state may be represented by quantum states that are the same as or similar to the quantum states included in Equations (8) and (9).

At block 304, the first and second copies of the initial quantum states may be evolved to prepare a first copy and a second copy of a final quantum state. In some embodiments, the process of evolving the first copies and the second copies of the initial quantum states to prepare the first copy and the second copy of the final quantum state may involve the same or a similar process as described in relation to the computing system 200 of FIG. 2 in which the initial quantum states 210 are used to output amplified quantum states 230 that are in turn used to determine the estimated amplified quantum state 230 having the form described in Equation (13).

At block 306, the first copy of the final quantum state may be used to estimate an amplitude corresponding to a given index, i, and the second copy of the final quantum state may be used to perform quantum rounding as described in relation to block 308 below.

At block 308, one or more signs may be estimated by using an amplitude estimation quantum rounding process for each index. In some embodiments, the amplitude estimation quantum rounding process may involve preparing copies of a random quantum state, $|\lambda\rangle$, and a quantum state for each index, i, having the following form:

$$|\phi_i\rangle = \frac{1}{\sqrt{2}}(|0\rangle|\psi_i^{(T)}\rangle + |1\rangle|i\rangle|\lambda\rangle) \tag{14}$$

in which $$|\psi_i^{(T)}\rangle$$

is represented by the following form:

$$|\psi_i^{(T)}\rangle = \sum_{i=1}^{n} a_i^{(T)}|i\rangle|v_i^{(T)}\rangle \tag{15}$$

A Hadamard transformation may be applied to the first qubit, which may transform the $|0\rangle$ and the $|1\rangle$ quantum states in superposition to facilitate estimating an amplitude of the $|0\rangle$ quantum state represented by the $$a_i^{(T)}$$

term. The estimated amplitude may then be used to facilitate estimation of an inner product between a quantum state relevant to the maximum-cut problem represented by $$|v_i^{(T)}\rangle$$

and the random quantum state, $|\lambda\rangle$, with a positive inner product indicating a sign of the variable, $x_i$, corresponding to the relevant quantum state $$|v_i^{(T)}\rangle$$

should be set as positive, and a negative inner product indicates that the sign of the variable should be set as negative. In these and other embodiments, the amplitude estimation quantum rounding process may be repeated iteratively for each index because each index may correspond to a respective variable of the maximum-cut problem. By iteratively performing the amplitude estimation quantum rounding process, the sign assignments for each of the variables involved with the maximum-cut problem may be estimated.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

FIG. 4 is a flowchart of the example method 400 of determining a feasible solution to the correlation clustering problem according to one or more embodiments of the operations of the computing system 200 of FIG. 2. The method 400 may be performed by any suitable system, apparatus, or device. For example, the amplification module 220 and the amplitude estimation module 240 of FIG. 2 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where three copies of initial quantum states are generated. In some embodiments, each copy of the initial quantum state may be the same as or similar to the initial quantum states 110 as described in relation to the memory-saving quadratic form optimization process of FIG. 1 and the initial quantum states 210 as described in relation to the computing system 200 of FIG. 2. As such, the each copy of the initial quantum state may be represented by quantum states that are the same as or similar to the quantum states included in Equations (8) and (9).

At block 404, the three copies of the initial quantum states may be evolved to prepare three copies of a final quantum state. In some embodiments, the process of evolving each copy of the initial quantum states to prepare the copies of the final quantum state may involve the same or a similar process as described in relation to the computing system 200 of FIG. 2 in which the initial quantum states 210 are used to output amplified quantum states 230 that are in turn used to determine the estimated amplified quantum state 230 having the form described in Equation (13).

At block 406, the first copy of the final quantum state may be used to estimate an amplitude corresponding to a given index, i, and the second copy and the third copy of the final quantum state may be used to perform quantum rounding as described in relation to block 408 below.

At block 408, one or more signs may be estimated by using an amplitude estimation quantum rounding process for each index. In some embodiments, the amplitude estimation quantum rounding process for determining the feasible solution to the correlation clustering problem may involve preparing two random quantum states, $|\lambda_1\rangle$ and $|\lambda_2\rangle$, with the quantum state for each given index i being represented according to Equations (14) and (15) for each of the two random quantum states.

Applying a Hadamard transformation to the first qubit may facilitate estimation of an inner product between a quantum state relevant to the correlation clustering problem represented by $$|v_i^{(T)}\rangle$$

and each of the random quantum states, $|\lambda_1\rangle$ and $|\lambda_2\rangle$, with a positive inner product indicating a sign of the variable, $x_i$, corresponding to the relevant quantum state $$|v_i^{(T)}\rangle$$

should be set as positive, and a negative inner product indicates that the sign of the variable should be set as negative. Because the inner product may be computed for each of the two random quantum states, four combinations of estimated variable signs may result: a positive variable corresponding to $|\lambda_1\rangle$ with a positive variable corresponding to $|\lambda_2\rangle$, a positive variable corresponding to $|\lambda_1\rangle$ with a negative variable corresponding to $|\lambda_2\rangle$, a negative variable corresponding to $|\lambda_1\rangle$ with a positive variable corresponding to $|\lambda_2\rangle$, and a negative variable corresponding to $|\lambda_1\rangle$ with a negative variable corresponding to $|\lambda_2\rangle$. Each combination of estimated variable signs may represent a respective cluster assignment of the correlation clustering problem. In these and other embodiments, the amplitude estimation quantum rounding process may be repeated iteratively for each index because each index may correspond to a respective variable of the correlation clustering problem. A total set of combinations of estimated variable signs for each index may represent the feasible solution to the correlation clustering problem. By iteratively performing the amplitude estimation quantum rounding process, the sign assignments for each of the variables involved with the correlation clustering problem may be estimated.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
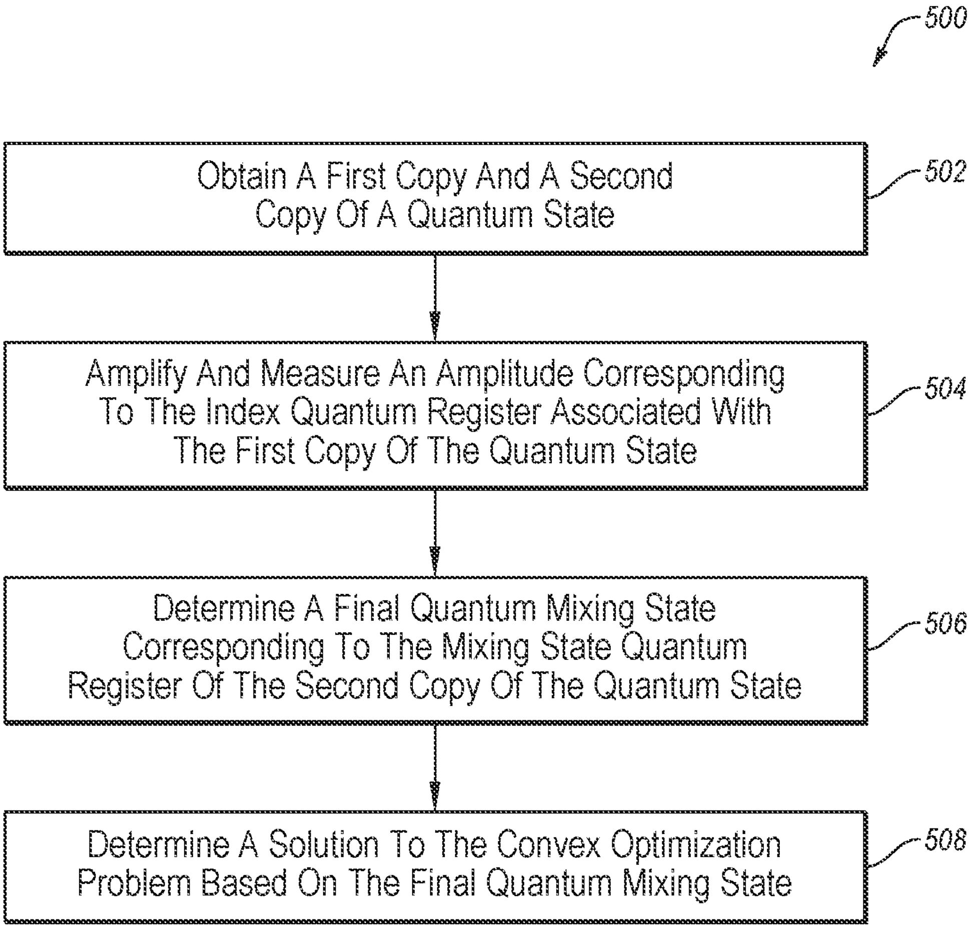
FIG. 5 is a flowchart of an example method of performing memory-saving optimization of quadratic forms according to one or more embodiments of the present disclosure.

FIG. 5 is a flowchart of an example method 500 of performing memory-saving optimization of quadratic forms according to one or more embodiments of the present disclosure. The method 500 may be performed by any suitable system, apparatus, or device. For example, the amplification module 220 and the amplitude estimation module 240 of FIG. 2 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where a first copy and a second copy of a quantum state may be obtained. In some embodiments, the first copy of the quantum state and the second copy of the quantum state may be identical to each other. The first and the second copies of the quantum state may each represent a convex optimization problem, and each copy of the quantum state may respectively include an index quantum register and a mixing state quantum register. The index quantum register may hold one or more indices, and the mixing state quantum register may hold one or more quantum mixing states. In these and other embodiments, obtaining the first copy and the second copy of the quantum state may involve setting each of the first copy and the second copy of the quantum state as an initial quantum state and applying a linear combination of unitary operations in superposition to each of the initial quantum states. Applying the linear combination of unitary operations to the initial quantum states may involve applying Equations (6) and (7) as described above in relation to FIG. 1 in series or in parallel to the initial quantum states.

At block 504, an amplitude corresponding to the index quantum register associated with the first copy of the quantum state may be amplified and measured. In some embodiments, the measured amplified amplitude may correspond to a particular index of the indices held by the index quantum register. In these and other embodiments, the amplifying and measuring of the amplitude corresponding to the index quantum register associated with the first copy of the quantum state may include applying an inverse operation to the index quantum register in which the inverse operation corresponds to the linear combination of unitary operations.

At block 506, a final quantum mixing state corresponding to the mixing state quantum register may be determined. Determining the final quantum mixing state may involve amplifying an amplitude corresponding to the index quantum register associated with the second copy of the quantum state and estimating an amplitude of the mixing state quantum register associated with the second copy of the quantum state at the particular index based on the amplified amplitude of the index quantum register associated with the second copy of the quantum state.

At block 508, a solution to the convex optimization problem may be determined based on the final quantum mixing state. Determining the solution to the convex optimization problem may involve performing a quantum rounding process based on the final quantum mixing state corresponding to the mixing state quantum register of the second copy of the quantum state. In some embodiments, the convex optimization problem may include a maximum-cut problem, a correlation clustering problem, some combination thereof, or any other scenario that may be mathematically modeled using quadratic forms.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
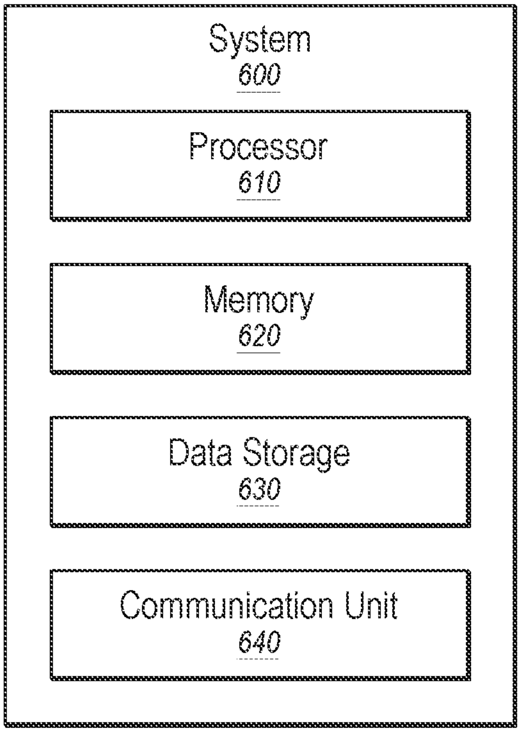
FIG. 6 is an example computer system according to one or more embodiments of the present disclosure.

FIG. 6 is an example computer system 600 according to one or more embodiments of the present disclosure. The computing system 600 may include a processor 610, a memory 620, a data storage 630, and/or a communication unit 640, which all may be communicatively coupled. Any or all of the environment 100 of FIG. 1 or the system 200 of FIG. 2 may be implemented as a computing system consistent with the computing system 600.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to cause the computing system 600 to perform the operations of the method 300 of FIG. 3, the method 400 of FIG. 4, or the method 500 of FIG. 5. For example, the computing system 600 may execute the program instructions to obtain a first copy and a second copy of initial quantum states, amplify and measure an amplitude corresponding to the first quantum register associated with the first copy of the initial quantum states, determine a final quantum mixing state corresponding to the second quantum register, and determine a solution to the convex optimization problem based on the final quantum mixing state.

The memory 620 and the data storage 630 may include computer-readable storage media or one or more computer-readable storage mediums for having computer-executable instructions or data structures stored thereon. Such computer-readable storage media may be any available media that may be accessed by a general-purpose or special-purpose computer, such as the processor 610. For example, the memory 620 and/or the data storage 630 may include the initial quantum states 210, the amplified quantum states 230, or the estimated amplitude coefficient 250 of FIG. 2. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a particular operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:

obtaining a first copy of a quantum state and a second copy of the quantum state, the first copy and the second copy of the quantum state representing a convex optimization problem in which the first copy of the quantum state and the second copy of the quantum state include respective index quantum registers that each hold a plurality of indices and respective mixing state quantum registers that each hold one or more quantum mixing states;

amplifying and measuring an amplitude corresponding to the index quantum register associated with the first copy of the quantum state, the measured amplified amplitude of the index quantum register corresponding to a particular index of the plurality of indices;

determining a final quantum mixing state corresponding to the mixing state quantum register of the second copy of the quantum state based on the measured amplified amplitude and the particular index of the index quantum register associated with the first copy of the quantum state; and determining a solution to the convex optimization problem based on the final quantum mixing state.

2. The method of claim 1, wherein the obtaining of the first copy of the quantum state and the second copy of the quantum state includes:

setting the first copy of the quantum state and the second copy of the quantum state as respective initial quantum states; and applying a linear combination of unitary operations in superposition to each of the initial quantum states.

3. The method of claim 2, wherein the linear combination of unitary operations is applied to the index quantum registers respectively corresponding to the first copy of the quantum state and the second copy of the quantum state in series or in parallel.

4. The method of claim 2, wherein the amplifying and measuring of the amplitude corresponding to the index quantum register associated with the first copy of the quantum state includes applying an inverse operation to the index quantum register, the inverse operation corresponding to the linear combination of unitary operations.

5. The method of claim 1, wherein determining the final quantum mixing state corresponding to the mixing state quantum register of the second copy of the quantum state includes:

amplifying an amplitude of the index quantum register associated with the second copy of the quantum state; and estimating an amplitude of the mixing state quantum register associated with the second copy of the quantum state corresponding to the particular index based on the amplified amplitude of the index quantum register associated with the second copy of the quantum state.

6. The method of claim 1, wherein the determining of the solution to the convex optimization problem includes performing a quantum rounding process based on the final quantum mixing state corresponding to the mixing state quantum register of the second copy of the quantum state.

7. The method of claim 1, wherein the convex optimization problem is a maximum-cut problem or relates to correlation clustering.

8. One or more non-transitory computer-readable storage media configured to store instructions that, in response to being executed, cause a system to perform operations, the operations comprising:

obtaining a first copy of a quantum state and a second copy of the quantum state, the first copy and the second copy of the quantum state representing a convex optimization problem in which the first copy of the quantum state and the second copy of the quantum state include respective index quantum registers that each hold a plurality of indices and respective mixing state quantum registers that each hold one or more quantum mixing states;

amplifying and measuring an amplitude corresponding to the index quantum register associated with the first copy of the quantum state, the measured amplified amplitude of the index quantum register corresponding to a particular index of the plurality of indices;

determining a final quantum mixing state corresponding to the mixing state quantum register of the second copy of the quantum state based on the measured amplified amplitude and the particular index of the index quantum register associated with the first copy of the quantum state; and determining a solution to the convex optimization problem based on the final quantum mixing state.

9. The one or more non-transitory computer-readable storage media of claim 8, wherein the obtaining of the first copy of the quantum state and the second copy of the quantum state includes:

setting each of the first copy of the quantum state and the second copy of the quantum state as an initial quantum state; and applying a linear combination of unitary operations in superposition to each of the initial quantum states.

10. The one or more non-transitory computer-readable storage media of claim 9, wherein the linear combination of unitary operations is applied to the index quantum registers respectively corresponding to the first copy of the quantum state and the second copy of the quantum state in series or in parallel.

11. The one or more non-transitory computer-readable storage media of claim 9, wherein the amplifying and measuring of the amplitude corresponding to the index quantum register associated with the first copy of the quantum state includes applying an inverse operation to the index quantum register, the inverse operation corresponding to the linear combination of unitary operations.

12. The one or more non-transitory computer-readable storage media of claim 8, wherein determining the final quantum mixing state corresponding to the mixing state quantum register of the second copy of the quantum state includes:

amplifying an amplitude of the index quantum register associated with the second copy of the quantum state; and estimating an amplitude of the mixing state quantum register associated with the second copy of the quantum state corresponding to the particular index based on the amplified amplitude of the index quantum register associated with the second copy of the quantum state.

13. The one or more non-transitory computer-readable storage media of claim 8, wherein the determining of the solution to the convex optimization problem includes performing a quantum rounding process based on the final quantum mixing state corresponding to the mixing state quantum register of the second copy of the quantum state.

14. The one or more non-transitory computer-readable storage media of claim 8, wherein the convex optimization problem is a maximum-cut problem or relates to correlation clustering.

15. A system comprising:

one or more processors; and one or more non-transitory computer-readable storage media configured to store instructions that, in response to being executed, cause the system to perform operations, the operations comprising:

obtaining a first copy of a quantum state and a second copy of the quantum state, the first copy and the second copy of the quantum state representing a convex optimization problem in which the first copy of the quantum state and the second copy of the quantum state include respective index quantum registers that each hold a plurality of indices and respective mixing state quantum registers that each hold one or more quantum mixing states;

amplifying and measuring an amplitude corresponding to the index quantum register associated with the first copy of the quantum state, the measured amplified amplitude of the index quantum register corresponding to a particular index of the plurality of indices;

determining a final quantum mixing state corresponding to the mixing state quantum register of the second copy of the quantum state based on the measured amplified amplitude and the particular index of the index quantum register associated with the first copy of the quantum state; and determining a solution to the convex optimization problem based on the final quantum mixing state.

16. The system of claim 15, wherein the obtaining of the first copy of the quantum state and the second copy of the quantum state includes:

setting each of the first copy of the quantum state and the second copy of the quantum state as an initial quantum state; and applying a linear combination of unitary operations in superposition to each of the initial quantum states.

17. The system of claim 16, wherein the linear combination of unitary operations is applied to the index quantum registers respectively corresponding to the first copy of the quantum state and the second copy of the quantum state in series or in parallel.

18. The system of claim 16, wherein the amplifying and measuring of the amplitude corresponding to the index quantum register associated with the first copy of the quantum state includes applying an inverse operation to the index quantum register, the inverse operation corresponding to the linear combination of unitary operations.

19. The system of claim 15, wherein determining the final quantum mixing state corresponding to the mixing state quantum register of the second copy of the quantum state includes:

amplifying an amplitude of the index quantum register associated with the second copy of the quantum state; and estimating an amplitude of the mixing state quantum register associated with the second copy of the quantum state corresponding to the particular index based on the amplified amplitude of the index quantum register associated with the second copy of the quantum state.

20. The system of claim 15, wherein the determining of the solution to the convex optimization problem includes performing a quantum rounding process based on the final quantum mixing state corresponding to the mixing state quantum register of the second copy of the quantum state.

* * * * *